United States Patent
Peru et al.

(10) Patent No.: US 10,457,332 B1
(45) Date of Patent: Oct. 29, 2019

(54) STRUCTURE OF A FRONT PART OF THE BODYSHELL OF A VEHICLE, NOTABLY A MOTOR VEHICLE

(71) Applicant: PSA Automobiles SA, Poissy (FR)

(72) Inventors: Marc Peru, Chatenay-Malabry (FR); Mathieu Penloup, Sceaux (FR)

(73) Assignee: PSA Automobiles SA, Poissy (FR)

( * ) Notice: Subject to any disclaimer, the term of this patent is extended or adjusted under 35 U.S.C. 154(b) by 0 days.

(21) Appl. No.: 16/340,045

(22) PCT Filed: Sep. 14, 2017

(86) PCT No.: PCT/FR2017/052462
§ 371 (c)(1),
(2) Date: Apr. 5, 2019

(87) PCT Pub. No.: WO2018/069591
PCT Pub. Date: Apr. 19, 2018

(30) Foreign Application Priority Data

Oct. 11, 2016 (FR) ...................................... 16 59836

(51) Int. Cl.
*B62D 25/08* (2006.01)
*B62D 29/04* (2006.01)
*B62D 25/14* (2006.01)
*B62D 29/00* (2006.01)
*B62D 21/15* (2006.01)
B62D 25/04 (2006.01)

(52) U.S. Cl.
CPC ........... *B62D 25/08* (2013.01); *B62D 21/152* (2013.01); *B62D 25/14* (2013.01); *B62D 29/00* (2013.01); *B62D 29/048* (2013.01); *B62D 25/04* (2013.01)

(58) Field of Classification Search
CPC .... B62D 21/155; B62D 25/04; B62D 29/048; B62D 25/145; B62D 25/045
USPC ......... 296/187.09, 187.1, 193.06, 193.02, 30
See application file for complete search history.

(56) References Cited

U.S. PATENT DOCUMENTS

2004/0113462 A1   6/2004   Winter et al.
2018/0065676 A1*  3/2018   Yoshida ................. B62D 25/20
2019/0016394 A1*  1/2019   Han ...................... B62D 25/2045
(Continued)

FOREIGN PATENT DOCUMENTS

| EP | 2014540 A1 | 1/2009 |
| EP | 2281732 A1 | 2/2011 |
| FR | 2986761 A1 | 8/2013 |

OTHER PUBLICATIONS

International Search Report for PCT/FR2017/052462 dated Dec. 22, 2017.
Written Opinion for PCT/FR2017/052462 dated Dec. 22, 2017.

*Primary Examiner* — Jason S Morrow
(74) *Attorney, Agent, or Firm* — Sandberg Phoenix & von Gontard, P.C.

(57) ABSTRACT

The invention relates to a structure of a front part of the bodyshell of a vehicle, notably a motor vehicle. According to the invention, the structure of the front part comprises reinforcing means secured to the A-pillar (5) and to the corresponding ends of the bodywork elements (1) so as to strengthen the connections between the A-pillar (5) and the bodywork elements (1) so as to prevent these connections from breaking in the event of a frontal impact of the vehicle. The invention applies to the automotive industry.

13 Claims, 3 Drawing Sheets

(56) References Cited

U.S. PATENT DOCUMENTS

2019/0185065 A1\* 6/2019 Jeong .................... B62D 25/085
2019/0185069 A1\* 6/2019 Inamoto ............... B62D 25/145

\* cited by examiner

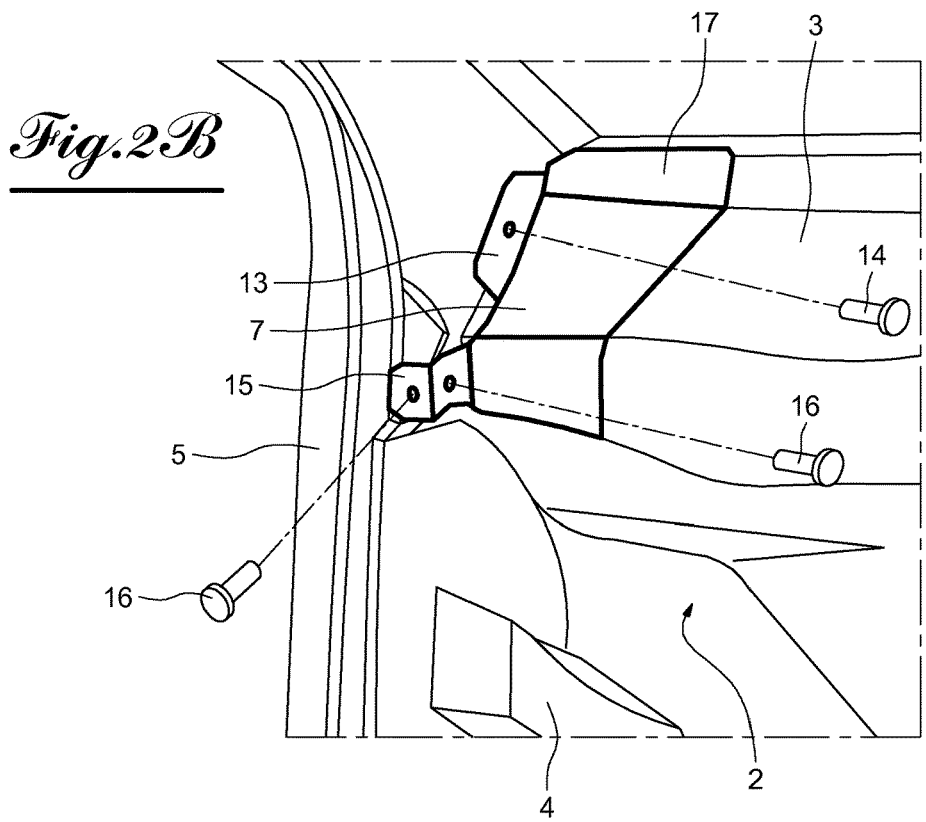
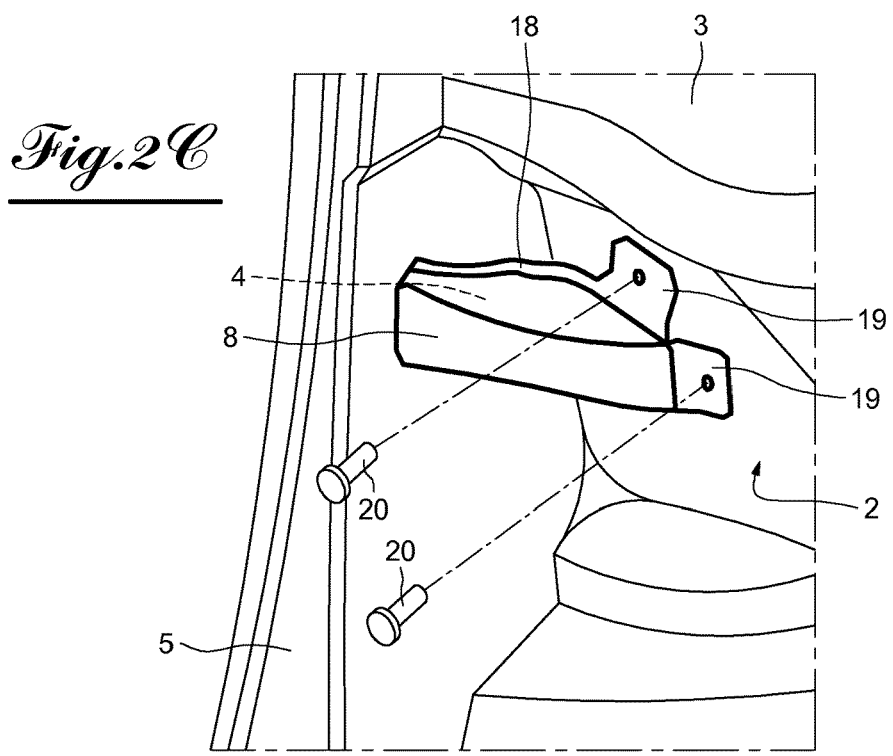

STRUCTURE OF A FRONT PART OF THE BODYSHELL OF A VEHICLE, NOTABLY A MOTOR VEHICLE

CROSS-REFERENCE TO RELATED APPLICATIONS

This application is the US National Stage under 35 USC § 371 of International Application No. PCT/FR2017/052462, filed 14 Sep. 2017, which claims priority to French Application No. 1659836 filed 11 Oct. 2016, both of which are incorporated herein by reference.

BACKGROUND

The invention relates to a structure of a front portion of a body shell of a vehicle, in particular a motor vehicle.

As is known, a front portion structure of a body shell of a motor vehicle comprises a transverse firewall intended to separate the passenger compartment from the engine compartment of the vehicle. The structure also comprises various bodywork elements comprising, in particular, a lateral firewall cross-member arranged to strengthen the transverse firewall of the structure, a lower bay cross-member on which the lower portion of the windshield of the vehicle rests, and a stretcher stabilizer resting against a corresponding stretcher of the vehicle, a stretcher being an element of the bodywork welded to a cross-member of the vehicle and arranged in the extension of a longitudinal member.

The three bodywork elements are each connected by an end to an A-pillar of a front door of the vehicle. However, in violent head-on collisions where the stresses are concentrated, in particular, on one side of the front portion of the vehicle and cover a maximum of twenty-five percent of the covering surface of the front portion of the vehicle, it is common for the connections between the bodywork elements and the A-pillar to be broken, which is a danger to the driver and, if present, to the passengers in the vehicle.

EP 2014540 discloses a structure of a front portion of the body shell of a vehicle comprising two lateral partitions strengthening the lower bay cross-member, the partitions each being attached to a corresponding junction plate and to an end of the lower bay cross-member, each junction plate extending longitudinally relative to the vehicle and being rigidly connected to the lower bay cross-member and to a suspension support. Thus, the presence of the lateral partitions allows the lower bay cross-member to be stiffened, which reduces the vibrations of the windshield and the emission of noises when vibrating.

However, the lateral partitions are not provided to strengthen the structure of the front portion of the vehicle, and therefore offer no additional safety should a head-on collision occur.

SUMMARY

The object of the present invention is to overcome the above drawbacks of the prior art. To achieve this aim, the invention relates to a structure of a front portion of the body shell of a vehicle, in particular a motor vehicle, having three bodywork elements comprising:
 a lateral firewall cross-member arranged to strengthen a transverse firewall of the front portion structure that separates the passenger compartment from the engine compartment of the vehicle;
 a lower bay cross-member on which the lower portion of the vehicle windshield rests; and
 a stretcher stabilizer resting against a corresponding stretcher of the vehicle;
wherein, the bodywork elements are each connected by an end to an A-pillar of the vehicle, the front portion structure comprising strengthening means connected to the A-pillar and to the corresponding ends of the bodywork elements in order to strengthen the connections between the A-pillar and the bodywork elements, to prevent the connections from breaking if the vehicle is in a head-on collision.

According to another aspect, the strengthening means comprises three independent sleeves covering respectively the ends of the three bodywork elements connected to the corresponding A-pillar, each sleeve comprising flanges connected to the A-pillar.

According to another aspect, each sleeve is produced from sheet metal with a high stamped yield point and has a thickness of between one and two millimeters, preferably of approximately 1.5 millimeters.

According to another aspect, each sleeve is produced from a composite carbon-fiber-based material and has a thickness of between four and six millimeters, preferably of approximately five millimeters.

According to another aspect, the strengthening means is produced as a single strengthening part covering the ends of the three bodywork elements connected to the corresponding A-pillar, the strengthening part comprising flanges rigidly connected to the corresponding A-pillar.

According to another aspect, the strengthening part is produced from sheet metal with a high stamped yield point and is between one and two millimeters thick, preferably approximately 1.5 millimeters.

According to another aspect, the strengthening part is produced from a composite carbon-fiber-based material and has a thickness of between four and six millimeters, preferably of approximately five millimeters.

According to another aspect, the front portion structure comprises a dashboard cross-member arranged to strengthen the dashboard of the vehicle and one end of which is attached to the corresponding A-pillar, and in that one of the flanges of the strengthening part is positioned in the region of the attachment interface between the dashboard cross-member and the corresponding A-pillar, the flange being positioned between the A-pillar and the end of the dashboard cross-member that is attached to the A-pillar.

The invention also relates to a motor vehicle the body shell of which comprises a front portion structure as described above.

DESCRIPTION OF THE FIGURES

The invention will be better understood, and other aims, characteristics, details and advantages thereof will appear more clearly in the explanatory description that will follow, produced with reference to the accompanying drawings which are given solely as an example illustrating two embodiments of the invention and in which:

FIGS. 2a to 2c each show a detail of the structure of FIG. 1 showing a portion of the strengthening means of the invention according to a first embodiment, each portion being rigidly connected to a bodywork element of the front portion structure and of the corresponding A-pillar;

FIG. 3b is a perspective view of the single strengthening part of FIG. 3a.

DETAILED DESCRIPTION

With reference to the figures, the front portion structure of a body shell of a motor vehicle will now be described.

Figure 1:
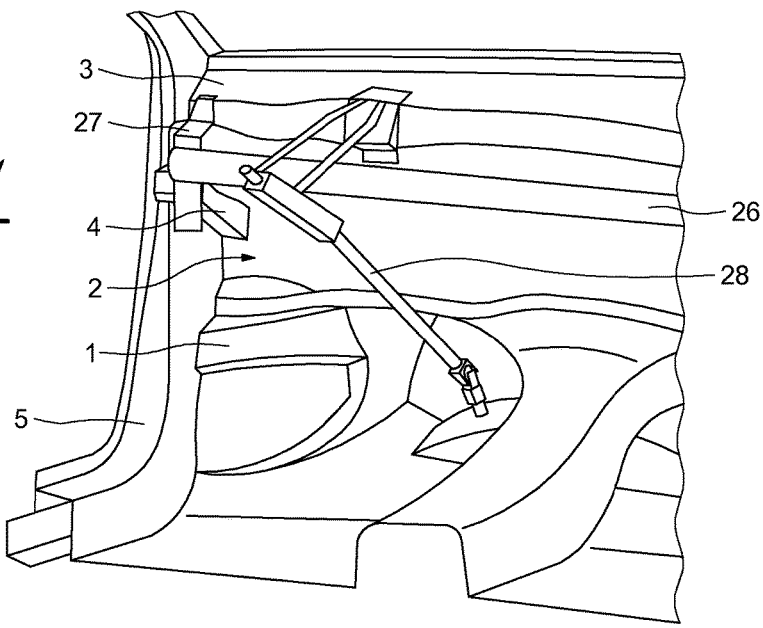
FIG. 1 is a perspective view, from the passenger compartment of a vehicle, of a known front portion structure of the vehicle.

FIG. 1 is a view from the passenger compartment of the front portion structure, more precisely the left front portion structure of the vehicle in the forward direction of forward movement of the vehicle, in other words comprising the portion of the passenger compartment intended for the driver of the vehicle.

The front portion structure comprises a transverse firewall 2. The firewall 2 is intended to separate the passenger compartment from the engine compartment of the vehicle. The front portion structure also comprises an A-pillar 5 to which the corresponding front door of the vehicle is generally pivotally mounted, and the function of which is to stabilize and stiffen the passenger compartment of the vehicle. Each A-pillar 5 is connected to the rest of the front portion structure by means of various bodywork elements of the front portion structure. In particular, four of the elements will now be described.

A first bodywork element comprises a lateral firewall cross-member 1, arranged to strengthen the transverse firewall 2 of the front portion structure. The cross-member 1, like all the other cross-members described hereinafter, is in the form of a small hollow beam produced from sheet metal. The opposite ends of the lateral firewall cross-member 1 are respectively welded to the left A-pillar 5 and the right A-pillar of the vehicle relative to the direction of forward movement of the vehicle.

A second bodywork element comprises a lower bay cross-member 3 on which the lower portion of the vehicle windshield rests. The opposite ends of the lower bay cross-member 3 are respectively welded to the left A-pillar 5 and the right A-pillar of the vehicle, the pillars being arranged respectively to the left and to the right.

A third bodywork element comprises a stretcher stabilizer 4. The stretcher stabilizer 4 shown in FIG. 1 is also in the form of a small hollow beam produced from sheet metal and extending longitudinally to the vehicle. The function thereof is to rest against the corresponding stretcher. Moreover, the opposite ends thereof are welded respectively to the corresponding A-pillar 5 and to the end of the corresponding stretcher.

A fourth bodywork element comprises a dashboard cross-member 26 mounted transversally to the vehicle and arranged to strengthen the vehicle dashboard. The dashboard cross-member 26 is rigidly connected at the opposite ends thereof to the left A-pillar 5 and the right A-pillar of the vehicle. Preferably, the dashboard cross-member 26 is in the form of a tube and will be referred to in the rest of the description as the dashboard tube 26. The function of the tube, one end 27 of which is connected by welding or screwing to the corresponding A-pillar 5, is to provide strength to the steering column 28 and to the steering wheel connected to the end of the steering column. In particular, in the case of a head-on collision, the dashboard tube 26 prevents the steering column 28 and the steering wheel from moving back towards the dashboard.

According to the invention, the front portion structure comprises strengthening means that are rigidly connected to the A-pillar 5 and to the corresponding ends of the first 1, second 3 and third 4 bodywork elements in order to strengthen the connections between the A-pillar 5 and the bodywork elements 1, 3 and 4. The strengthening means is produced from sheet metal with a high stamped yield point, the thickness of which is between one and two millimeters. Preferably, the sheet metal has a thickness of approximately 1.5 millimeters.

Alternatively, the strengthening means is produced from a composite carbon-fiber-based material molded onto the front portion structure. The strengthening means has, in this alternative embodiment, a thickness of between four and six millimeters, preferably of approximately five millimeters.

Figure 2A:
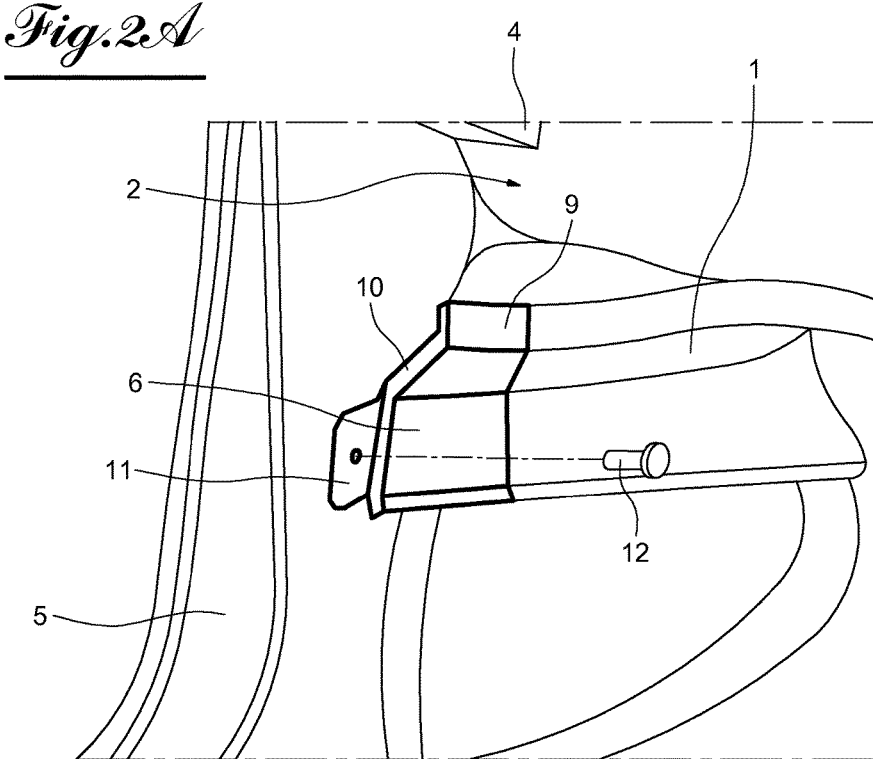

According to a first embodiment shown in FIGS. 2a to 2c, the strengthening means comprises three independent sleeves 6, 7, 8, each produced as described above either from sheet metal with a high yield point stamped onto the corresponding bodywork element, or from a composite carbon-fiber-based material molded onto the corresponding bodywork element.

The first sleeve 6, shown in FIG. 2a, matches the shape of the end of the lateral firewall cross-member 1 and covers the cross-member. The first sleeve 6 is attached to the end for example by bonding using a structural adhesive. The first sleeve 6 comprises flanges 9, 10 which are rigidly connected by bonding respectively to the transverse firewall 2 and to the corresponding A-pillar 5. Moreover, the first sleeve 6 comprises an attachment lug 11 extending from one of the edges 10 mounted rigidly connected to the A-pillar 5, the attachment lug 11 being positioned in the plane of the corresponding flange and screwed using at least one screw 12 to the corresponding A-pillar 5 to strengthen the connection between the first sleeve 6, the A-pillar 5 and the lateral firewall cross-member 1. Preferably, the screw is self-tapping in the existing structure, which avoids the prior production of threaded holes in the existing structure.

The second sleeve 7, shown in FIG. 2b, matches the shape of the end of the lower bay cross-member 3 and covers the cross-member. The second sleeve 7 is attached to the end for example by bonding using a structural adhesive. The second sleeve 7 comprises a flange 13 which is rigidly connected by screwing using at least one screw 14 to the corresponding A-pillar 5. Moreover, the second sleeve 7 comprises an attachment lug 15 extending from the body of the sleeve 7, the attachment lug 15 being attached by screwing using at least two screws 16 to the corresponding A-pillar 5 in order to strengthen the connection between the second sleeve 7, the A-pillar 5 and the lower bay cross-member 3. Preferably, the screws are self-tapping in the existing structure. Finally, the second sleeve 7 comprises another flange 17 rigidly connected by bonding to the lower bay cross-member 3.

The third sleeve 8, shown in FIG. 2c, matches the shape of the end of the stretcher stabilizer 4 and covers the stabilizer. The third sleeve 8 is attached to the stretcher stabilizer 4 for example by bonding using a structural adhesive. The third sleeve 8 comprises a flange 18 which is connected by bonding to the corresponding A-pillar 5. Moreover, the third sleeve comprises two attachment lugs 19 extending from the body of the sleeve, the attachment lugs being attached by screwing each using at least one screw 20 to the transverse firewall 2 in order to strengthen the connection between the third sleeve 8, the A-pillar 5 and the stretcher stabilizer 4. Preferably, the screws are self-tapping in the existing structure.

Figure 3A:
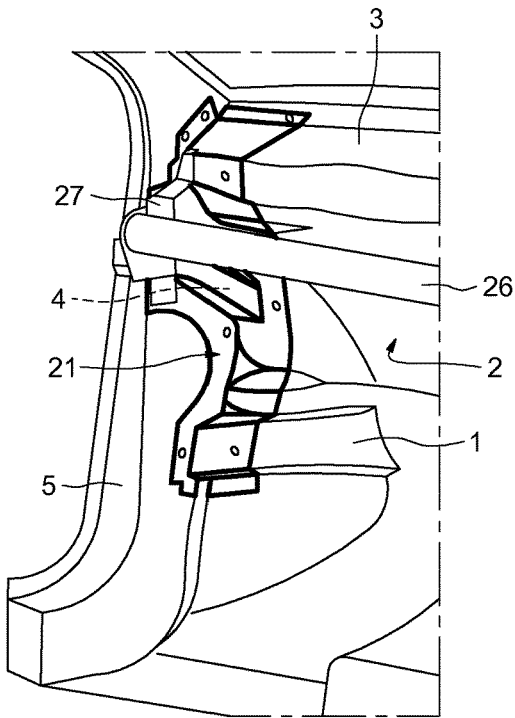
FIG. 3a shows a detail of the structure of FIG. 1, in which the strengthening means, formed by a single part according to a second embodiment of the invention, are connected.
Figure 3B:
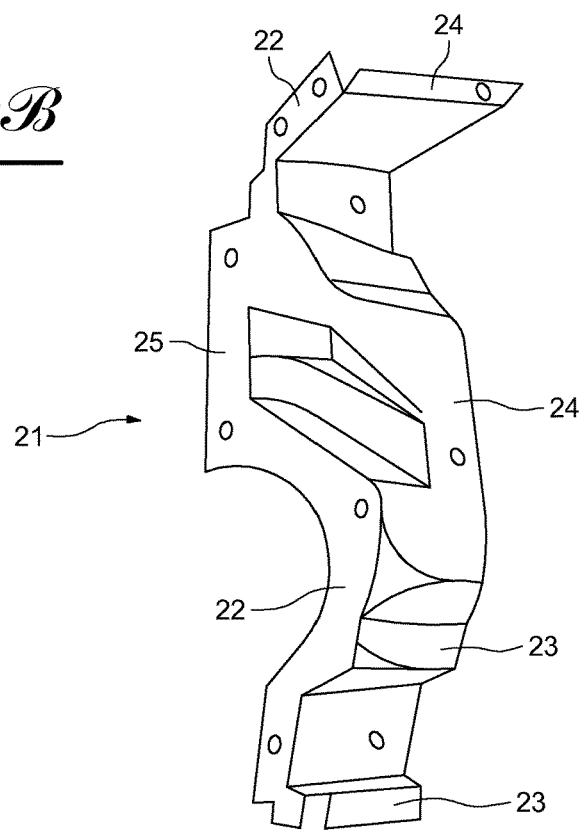

In a second embodiment shown in FIGS. 3a and 3b, the strengthening means is produced as a single part 21 simultaneously covering the ends of the three bodywork elements 1, 3, 4 described above. In order to be attached to the front portion structure, the strengthening part 21 is bonded using a structural adhesive, and screwed in places in particular in the region of the respective transverse firewall cross-member 1 and lower bay cross-member 3.

Moreover, the strengthening part comprises flanges (22, 25; 23; 24) attached respectively:
- by screwing to the corresponding A-pillar 5, using screws inserted transversally to the vehicle;
- by bonding in the region of the transverse firewall 2, near the lateral firewall cross-member 1;
- by screwing in the region of the lower bay cross-member 3 and near the stretcher stabilizer 4, using screws inserted longitudinally to the vehicle.

Preferably, the screws are self-tapping in the existing structure. Finally, to strengthen the connection between the strengthening part 21, the corresponding A-pillar 5 and the bodywork elements 1, 3, 4 of the front portion structure, one of the flanges 25 of the strengthening part 21 is arranged in the region of the attachment interface between the dashboard tube 26 and the corresponding A-pillar 5. Thus, the flange 25 is positioned between the A-pillar 5 and the attachment end 27 of the dashboard tube 26 attached to the A-pillar 5. This particular arrangement of the strengthening part 21 is advantageous because the connection interface already exists and is particularly robust.

Thus, whatever the embodiment of the strengthening means, the strengthening means allows the connections between the bodywork elements 1, 3, 4 of the front portion structure described above and the corresponding A-pillar 5 to be strengthened, which helps prevent the connections from breaking if the vehicle is in a head-on collision, even if such a head-on collision takes place at a speed of at least sixty-four kilometers an hour over a maximum of twenty-five percent of the covered surface of the front portion of the vehicle and extending along one side of the vehicle.

The invention claimed is:

1. A front portion of a body shell of a vehicle, in particular a motor vehicle, having three bodywork elements comprising:
   a lateral firewall cross-member arranged to strengthen a transverse firewall of the front portion structure of the vehicle that separates a passenger compartment from an engine compartment of the vehicle;
   a lower bay cross-member on which a lower portion of a vehicle windshield rests;
   a stretcher stabilizer resting against a corresponding stretcher of the vehicle;
said bodywork elements each being connected at an end to an A-pillar of the vehicle, the front portion structure comprising strengthening means connected to the A-pillar and to the corresponding ends of the bodywork elements in order to strengthen the connections between the A-pillar and the bodywork elements, to prevent said connections from breaking if the vehicle is in a head-on collision.

2. The front portion structure according to claim 1, wherein the strengthening means comprises three independent sleeves covering respectively the ends of the three bodywork elements connected to the corresponding A-pillar, each sleeve comprising flanges connected to the A-pillar.

3. The front portion structure according to claim 2, wherein each sleeve is produced from sheet metal with a high stamped yield point and has a thickness of between one and two millimeters.

4. The front portion structure according to claim 2, wherein each sleeve is produced from a composite carbon-fiber-based material and has a thickness of between four and six millimeters.

5. The front portion structure according to claim 1, wherein the strengthening means is produced as a single strengthening part covering the ends of the three bodywork elements connected to the corresponding A-pillar, the strengthening part comprising flanges connected to the corresponding A-pillar.

6. The front portion structure according to claim 5, wherein the strengthening part is produced from sheet metal with a high stamped yield point and is between one and two millimeters thick.

7. The front portion structure according to claim 5, wherein the strengthening part is produced from a composite carbon-fiber-based material and has a thickness of between four and six millimeters.

8. The front portion structure according to claim 5, wherein the front portion structure comprises a dashboard cross-member arranged to strengthen a dashboard of the vehicle and one end of which is attached to the corresponding A-pillar, and wherein one of the flanges of the strengthening part is positioned in the region of an attachment interface between the dashboard cross-member and the corresponding A-pillar, said flange being positioned between the A-pillar and the end of the dashboard cross-member that is attached to the A-pillar.

9. A motor vehicle of which the body shell comprises a front portion structure according to claim 1.

10. The front portion structure according to claim 3 wherein each sleeve has a thickness of approximately 1.5 millimeters.

11. The front portion structure according to claim 4 wherein each sleeve has a thickness of approximately five millimeters.

12. The front portion structure according to claim 6 wherein the strengthening part has a thickness of approximately 1.5 millimeters.

13. The front portion structure according to claim 7 wherein the strengthening part has a thickness of approximately five millimeters.

* * * * *